Sept. 25, 1928.

A. PFAU

BEARING

Filed Jan. 19, 1925

1,685,751

Inventor
A. Pfau
by
Attorney

Patented Sept. 25, 1928.

1,685,751

UNITED STATES PATENT OFFICE.

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

BEARING.

Application filed January 19, 1925. Serial No. 3,272.

This invention relates in general to improvements in supports for rotating elements, and relates more specifically to improvements in the construction and operation of automatically adjustable bearings for rotating elements.

An object of the invention is to provide a new and useful bearing structure which is simple in construction and efficient in operation.

Some of the more specific objects and advantages attainable with the present improvement are as follows:

To provide an improved automatically adjustable bearing structure for rotary horizontal shafts.

To provide a bearing structure for horizontal shafts which will effectively accommodate any desired loading of the shaft on opposite sides of the bearing.

To provide a bearing structure which will readily accommodate deflection in a shaft without interfering with the normal operation thereof.

To provide an improved compound bearing structure for deflectable rotating shafts.

To provide other improvements in the details of constuction of shaft bearings whereby the cost of construction thereof is reduced to a minimum and the efficiency is enhanced to a maximum.

A clear conception of several embodiments of the invention and of the operation of bearings constructed in accordance therewith, may be had by referring to the drawing accompanying and forming a part of this specification in which like reference characters designate the same or similar parts in the various views.

Figure 1:
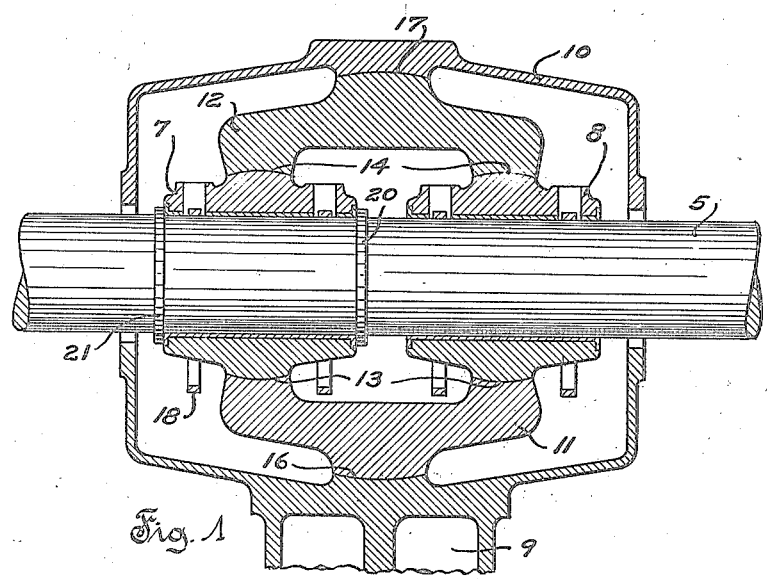
Fig. 1 is a central vertical section through one form of improved compound bearing.

The specific form of improved compound bearing illustrated in Fig. 1 comprises in general a pair of laterally spaced bearing elements 7, 8 coacting with a rotary shaft 5 and having spherical supporting and confining surfaces 13, 14 formed thereon. The lower supporting surfaces 13 of the elements 7, 8 coact with spherical surfaces formed on a common supporting member 11 and the upper spherical retaining surfaces 14 coact with spherical surfaces formed on the upper retaining member 12. The members 11, 12 have outer spherical zone surfaces 16, 17 generated about a common point, these surfaces coacting respectively with the common support 9 and with the cap 10 associated with the support 9. The shaft 5 is preferably provided with a pair of integral annular flanges 21, 20 which cooperate with end faces of one of the bearing elements 7, 8 to prevent endwise displacement of the shaft 5 relatively to the adjacent bearing element. Each of the bearing elements 7, 8 is also provided with cutaway portions within which are located oil rings 18 which dip into an oil basin formed in the common support 9 and thereby lubricate the bearing surfaces.

Figure 2:
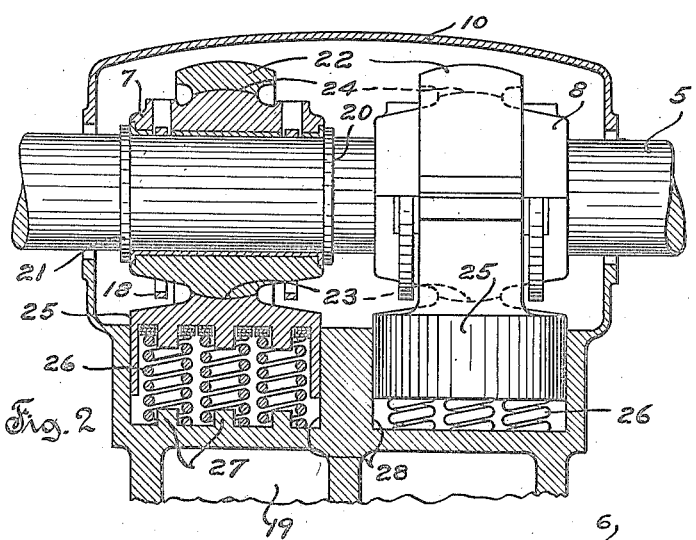
Fig. 2 is a partial central vertical section through another form of improved compound bearing structure.

The specific form of improved compound bearing illustrated in Fig. 2 comprises in general a pair of laterally spaced bearing elements 7, 8 coacting with a rotary shaft 5 and having spherical supporting and confining surfaces 23, 24 formed therein. The lower supporting surfaces 23 of the elements 7, 8 coact with spherical surfaces formed on independent vertically movable supports 25 and the upper spherical retaining surfaces 24 coact with spherical surfaces formed on retaining members 22 secured to the supports 25. The supports 25 are fitted in bores 28 of a common supporting member 19 and rest upon helical compression springs 26 which are retained in vertical position by means of projections 27 formed on the supporting member 19 and upon the supports 25 respectively. The shaft 5 is preferably provided with a pair of integral annular flanges 20, 21 which cooperate with end faces of one of the bearing elements 7, 8 to prevent endwise displacement of the shaft 5 relatively to the adjacent bearing elements. Each of the bearing elements 7, 8 is also provided with cutaway portions within which are located oil rings 18 which dip into an oil basin formed in the common supporting member 19 and thereby lubricate the bearing surfaces.

Figure 3:
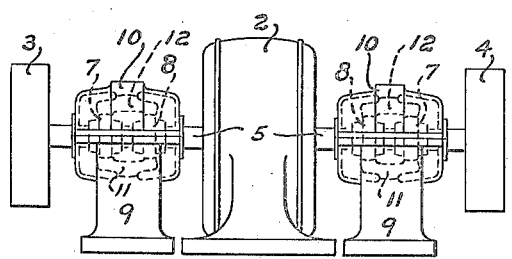
Fig. 3 is an elevation showing an assemblage of mechanism comprising several of the improved compound bearings and energy translating devices associated with the shaft supported thereby.
Figure 4:
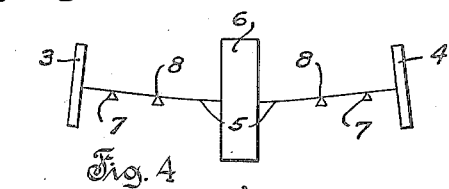
Fig. 4 is a diagrammatic view illustrating the operation of the improved compound bearing.

The compound bearings illustrated in Figs. 1 and 2 have special utility when utilized in a structure such as shown in Fig. 3. The bearings are located on opposite sides of an energy translating device such as an electric generator 2 the rotor of which is mounted upon a medial portion of the shaft 5. The shaft 5 extends through the compound bearings and has overhanging opposite ends to which energy translating devices such as hydraulic turbine rotors 3, 4 are secured. In the specific structure illustrated, the rotor of the generator 2 is considerably heavier than the hydraulic turbine rotors 3, 4 thus producing greater loading of the shaft 5 intermediate the compound bearings than at the ends of the shaft 5.

During normal operation of a machine embodying a bearing of the form illustrated in Fig. 1, the shaft 5 is normally rotating. If for any reason one end of the shaft 5 is deflected, and the opposite end thereof is permitted to move freely to accommodate such deflection, then the entire bearing structure will adjust itself about the spherical surfaces 16, 17. If on the other hand both ends of the shaft 5 are deflected in the same direction, then the independent bearing elements 7, 8 will automatically adjust themselves about the spherical surfaces 13, 14 to accommodate such deflection. If the deflection of one end is greater than a deflection in like direction of the opposite end, then the independent elements 7, 8 will adjust themselves about the surfaces 13, 14 and the entire bearing will also adjust itself about the spherical bearings 16, 17. In this manner the compound bearing will automatically accommodate deflection of the shaft 5 in any manner.

During normal operation of a machine embodying a bearing of the form illustrated in Fig. 2, the shaft 5 is likewise normally rotating. If for any reason one end of the shaft 5 is deflected, and the opposite end thereof is permitted to move freely to accommodate such deflection, then both bearing elements 7, 8 will adjust themselves about the spherical surfaces 23, 24 and one of the supports 25 will move downwardly compressing the springs 26 thereunder. If on the other hand both ends of the shaft 5 are loaded a like amount, no deflection of the shaft 5 will occur as the springs 26 will accommodate such loading. If the load on one end of the shaft 5 is greater than on the other, then both supports 25 will move downwardly distances proportional to the respective loadings and the bearing elements 7, 8 will adjust themselves upon the surfaces 23, 24 to accommodate the unequal loading. In this manner the compound bearing will automatically accommodate deflection of the shaft 5 in any manner.

It will be noted that with either form of bearing the integral flanges 20, 21 effectively prevent endwise displacement of the shaft 5. Regardless of the nature of the deflection, the elements 7, 8 will always retain their surface contact with the shaft 5 and unequal wear on these elements is avoided. As the elements 7, 8 are constructed in halves, they may be readily assembled and dismantled. The members 12, 22 are likewise removable thereby permitting free application and removal of the elements 7, 8. The caps 10 are likewise removable from the members 9, 19 thereby permitting access to all portions of the bearing structures. It may be necessary, in case the fitting of the supports 25 within the bores 28 is very close, to provide a vent opening for the space beneath each support 25, but this is a detail readily apparent to those skilled in the art.

It should be understood that it is not desired to limit the invention to the exact details of construction and operation herein shown and described, for various modifications within the scope of the claims may occur to persons skilled in the art.

It is claimed and desired to secure by Letters Patent:

1. In combination with a horizontal shaft which is subjected to lateral end loads and an intermediate load, of bearings coacting with said shaft between said intermediate load and each of said end loads, each of said bearings comprising a pair of independent longitudinally tiltable bearing elements coacting with said shaft directly adjacent to each other and a support formed to permit relative vertical displacement of said adjacent elements, and means for preventing longitudinal displacement of said shaft in either direction relative to one of said elements of each bearing.

2. In combination with a horizontal shaft which is subjected to lateral end loads and an intermediate load, of bearings coacting with said shaft between said intermediate load and each of said end loads, each of said bearings comprising a pair of independent longitudinally tiltable bearing elements coacting with said shaft directly adjacent to each other and a spring support formed to permit relative vertical displacement of said adjacent elements, and means for preventing longitudinal displacement of said shaft in either direction.

In testimony whereof, the signature of the inventor is affixed hereto.

ARNOLD PFAU.